April 15, 1952 W. S. LANDON 2,592,913
LIQUID LEVEL CONTROL MEANS
Filed May 15, 1947 3 Sheets-Sheet 1

INVENTOR.
WALTER S. LANDON, DEC'D.
BY MARION E. LANDON, ADM'X.
BY
Andrew K. Foulds
her ATTORNEY April 15, 1952     W. S. LANDON     2,592,913
LIQUID LEVEL CONTROL MEANS
Filed May 15, 1947            3 Sheets-Sheet 2
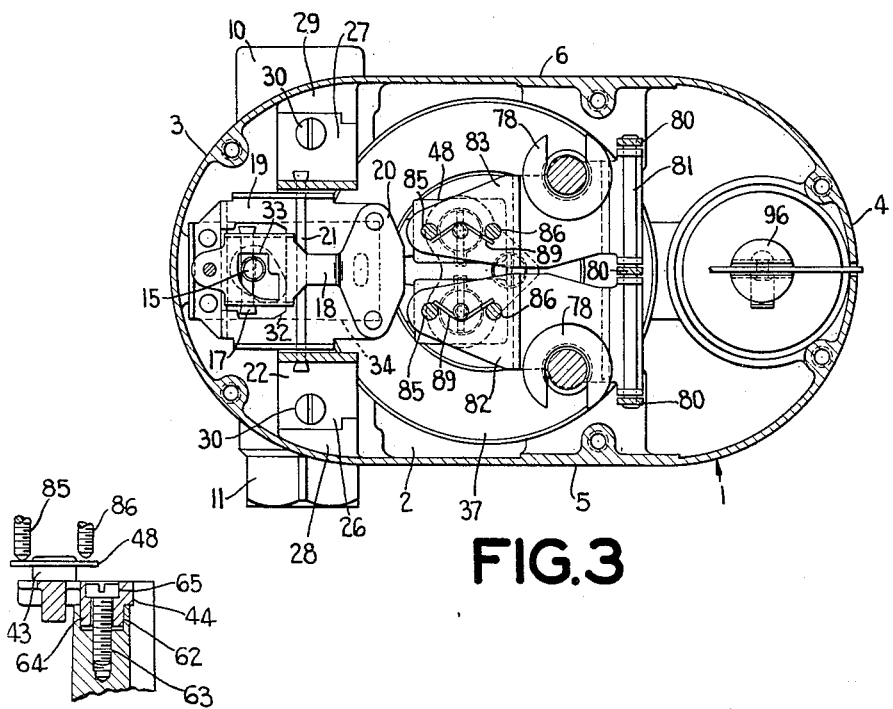
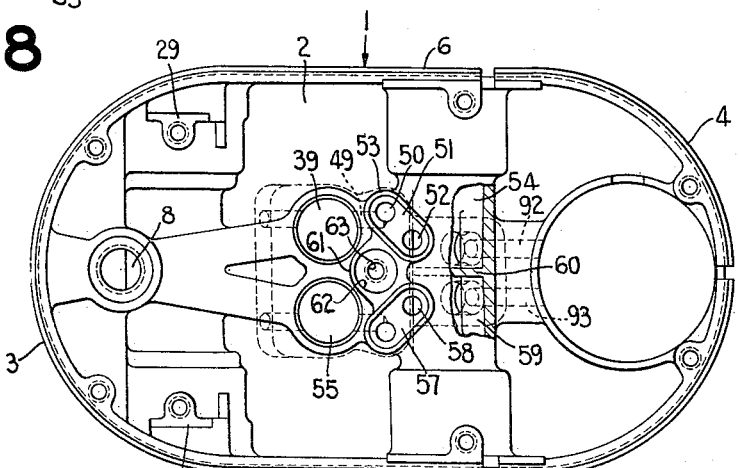
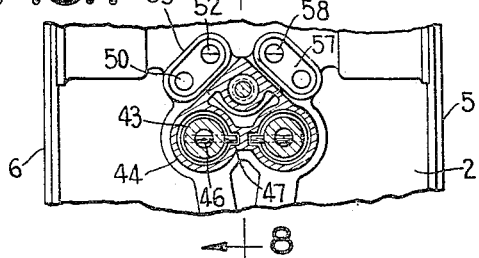
INVENTOR.
WALTER S. LANDON, DEC'D.
BY MARION E. LANDON, ADM'X.
BY
Andrew K. Foulds
her ATTORNEY

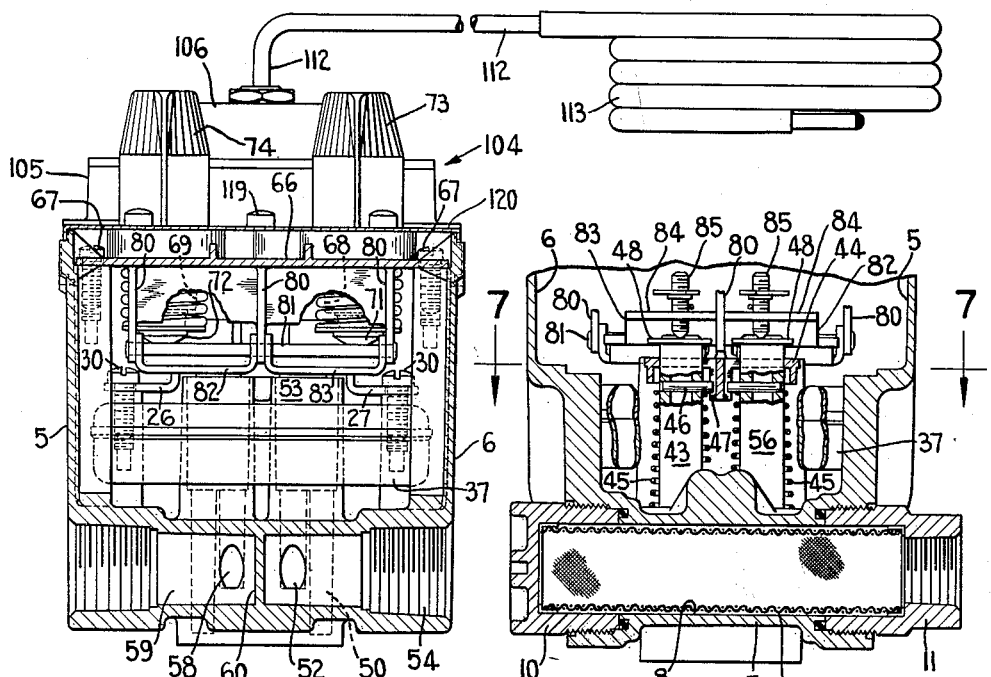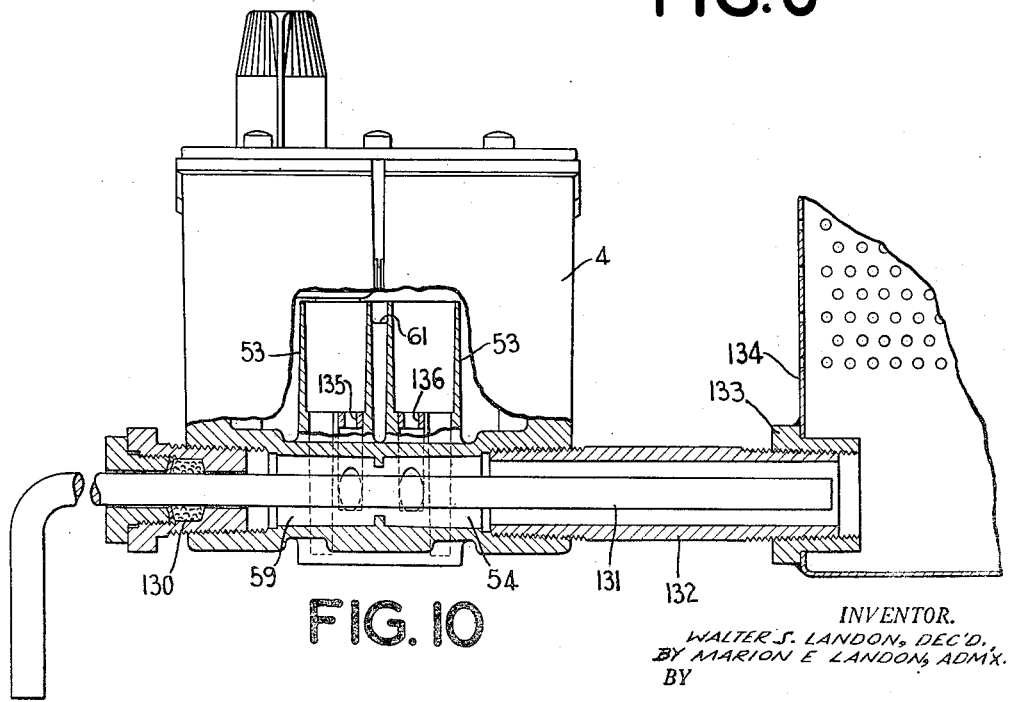

Patented Apr. 15, 1952

2,592,913

UNITED STATES PATENT OFFICE 2,592,913

LIQUID LEVEL CONTROL MEANS

Walter S. Landon, deceased, late of Detroit, Mich., by Marion E. Landon, administratrix, Detroit, Mich., assignor to Detroit Lubricator Company, Detroit, Mich., a corporation of Michigan Application May 15, 1947, Serial No. 748,301

15 Claims. (Cl. 137—68)

1

This invention relates to new and useful improvements in devices for maintaining a substantially constant liquid level.

One object of the invention is to provide a device having a float operated inlet valve mechanism so constructed and arranged as to maintain a constant liquid level irrespective of the usual changes in the liquid inlet head pressure on the inlet valve or the usual changes in the rate of outflow of liquid from the device or irrespective of both such changes.

Another object is to provide means to compensate for changes in viscosity due to changes in liquid temperature so as to maintain a predetermined rate of liquid flow from the device.

Another object is to provide a novel safety control mechanism for closing the inlet valve.

Another object is to provide a device which can be readily assembled and disassembled.

Another object is to provide temperature operated means for closing the inlet valve.

Another object is to provide a novel control means for the outlet metering valve by which the limits of valve movement can be adjusted while maintaining valve movement throughout and from end to end of the range of fixed travel of the valve operator.

Another object is to provide means to close the inlet valve upon liquid level increase in the outlet passageway leading from the device.

Another object is to provide means by which a stream of air is supplied to the outlet passageway in overlying relation to the discharging liquid fuel.

The invention consists in the improved and novel construction and arrangement of parts and their cooperative relation, to be more fully described hereinafter and the novelty of which will be particularly pointed out and distinctly claimed.

In the accompanying drawings, to be taken as a part of this specification, there are fully and clearly illustrated several preferred embodiments of the invention, in which drawings:

Fig. 3 is a view in horizontal section on the line 3—3 of Fig. 2;

Fig. 4 is a top plan view of the casing with the mechanisms removed and with certain parts in horizontal section;

2

Figure 1:
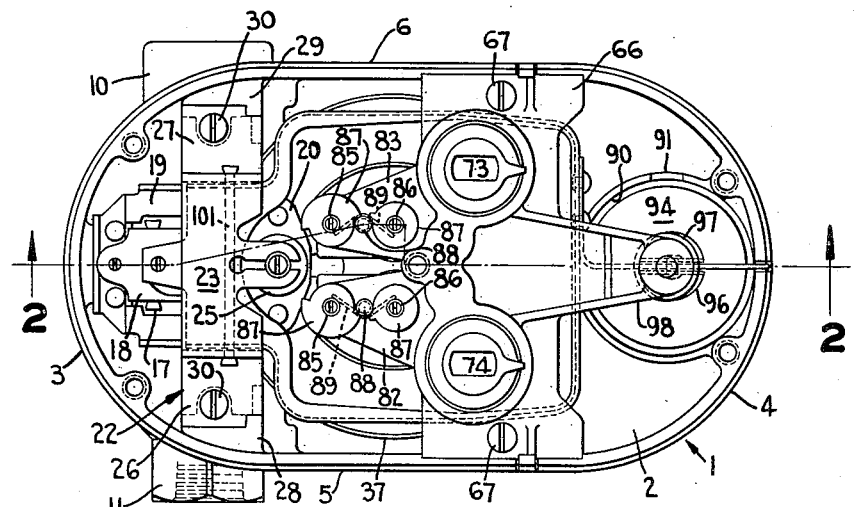
Figure 1 is a top plan view of the control device but having the cover and certain temperature responsive control means removed to show internal construction.
Figure 2:
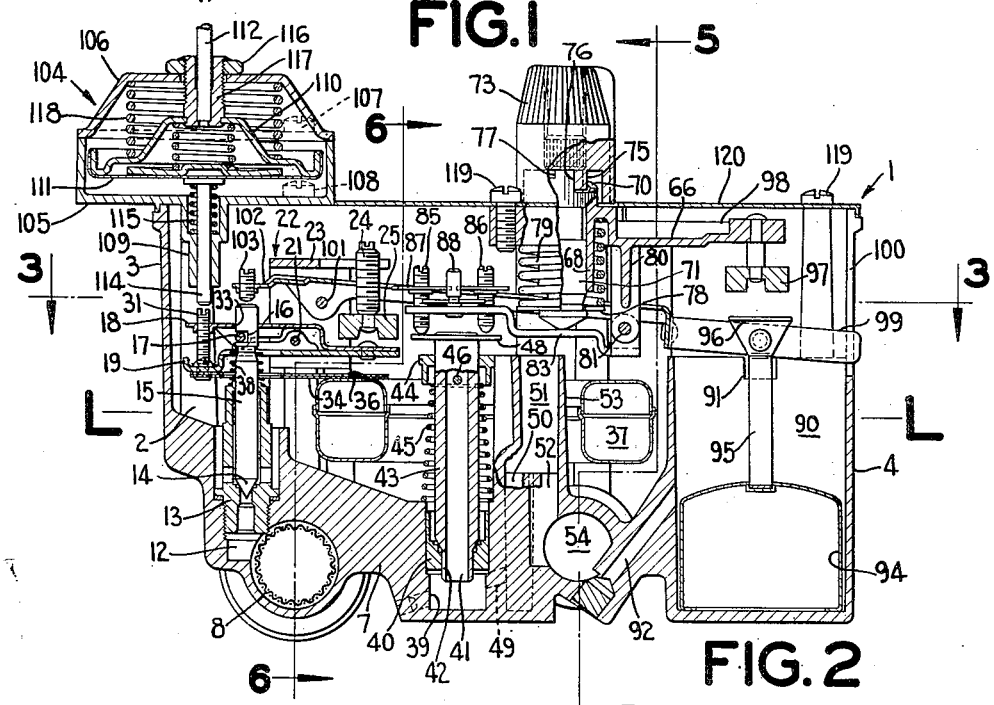
Fig. 2 is a view in vertical section on the line 2—2 of Fig. 1 but with certain parts broken away and in section more clearly illustrates the same.
Figure 9:
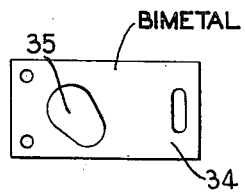

Fig. 5 is a view in vertical section on the line 5—5 of Fig. 2;

Fig. 6 is a view of part of the control device in vertical section on the line 6—6 of Fig. 2 but with the main float broken away and the metering valve guide means in vertical section;

Fig. 7 is a detail view in horizontal section on the line 7—7 of Fig. 6;

Fig. 8 is a detail vertical sectional view on the line 8—8 of Fig. 7;

Fig. 9 is a detail plan view of a bimetal compensating arm or plate which supports the main float, and Fig. 10 is an end view of a modification of the device partly in section to show the outlet passageway and also showing the device operatively connected to a vaporizing type oil burner.

Referring to the drawings by characters of reference, 1 designates a hollow casing preferably a metal die casting, which forms a constant level liquid chamber or reservoir 2 which is of substantially oval or elongated form having curved end walls 3, 4 joining paralleled side walls 5, 6. The bottom wall 7 has a horizontal cylindrical strainer chamber 8 open at its opposite ends and positioned adjacent the end wall 3. Within the chamber 8 there is a tubular strainer member 9 of fine wire mesh which is open at its ends which are provided with ferrules or metal rings. The strainer is clamped and sealed between screw plugs 10, 11 which are screw threaded into the ends of the chamber 8, the plug 10 forming a closure member. The plug 11 is tubular and internally screw threaded to provide a fitting to receive a pipe leading from the liquid supply tank or other source of liquid supply. In the bottom wall 7 between the chamber 8 and the end wall 3 there is a vertical inlet passageway 12 which communicates at its lower end with the chamber 8 and which opens at its upper end into the constant level chamber 2. In the passageway 12 there is a tubular guide and valve seat member 13 in which there is vertically guided for reciprocation a valve member 14. Above the guide member 13, the valve member stem 15 has a horizontal edge slot 16 which substantially fits on a bar or rod 17 for connecting the valve member to the valve operating lever mechanism. The rod 17 is secured at its ends in down-turned flanges of a resilient adjustment arm 18. The arm 18 is rigidly secured as by rivets to a supporting lever 19 and has its riveted end portion of magnetic material to provide an armature 20 which is on the opposite side of the lever supporting shaft 21 from the valve member 14. The shaft or pivot pin 21 is secured at its ends in the vertical side members of an inverted U-shaped bracket or saddle 22. The horizontal bracket cross member 23 has a slotted projecting portion which adjustably carries a magnet supporting screw 24 to the lower end of which a permanent magnet 25 is rigidly secured in overlying cooperable relation to the armature 20. The saddle or bracket 22 has horizontal end flanges 26, 27 which seat in top recesses in side wall posts 28, 29 respectively to which the bracket is rigidly secured by screws 30. The free end of the resilient arm 18 carries an adjustment screw 31 which has its lower end engaging the end of the lever 19, the screw being positioned on the opposite side of the valve member 14 from the fulcrum shaft 21. This screw 31 holds the arm 18 under tension and positions the valve member relative to the lever 19. The valve stem 15 extends through alined apertures 32, 33 through the lever 19 and arm 18 respectively and projects above the arm 18. The aperture or opening 33 is of angular form so that the valve member 14 is locked against accidental displacement from the bar 17. To remove the valve member from its engagement with the bar 17, the valve member is slid and rotated counterclockwise into the off-set portion of the opening 33, this of course only being possible when the lever mechanism and valve member have been removed from the casing 1. Rigidly secured to the end of the lever 19 on the opposite side of the valve member 14 from the pivot pin 21 there is one end of a bimetal compensating plate or arm 34, see Fig. 9, which is apertured as at 35 for passage of the stem 15 therethrough and which extends substantially parallel to the lever 19 and substantially horizontally at normal ambient and oil temperatures and when the valve member is seated. Rigidly secured as at 36 to the end portion of the plate 34 which underlies the magnet 25 there is an annular hollow main float 37. The bimetal plate 34 flexes downward at its float connected end upon temperature increase so that the constant maintained liquid level is held at successively slightly lower levels in accordance with increasing temperature and is held at successively slightly higher levels for decreasing temperatures by upward bowing or flexing of the plate 34. The constant level for normal ambient temperature of say 70° is indicated by the line L—L. A bimetal plate satisfactory for this use is the No. 2400 Bimetal made by the W. M. Chace Company of Detroit, Michigan, having a thickness of .015", a width of ¾" and a length from the center line of the rivet holes to its point of connection to the float of 1$\frac{5}{32}$". Seated on the end of the guide member 13 there is a coil spring 38 which seats at its upper end against the underside of a flange or shoulder on the stem 15 to hold the bottom face of the slot 16 against the rod 17 so as to take up any play between these parts.

In the bottom wall 7 substantially concentric with the chamber 2 there is an upward facing cylindrical recess 39 containing a valve seat member 40 and forming the inlet end portion of an outlet passageway from the chamber 2. The device is constructed to have two such outlet passageways which are of identical construction and arrangement and therefore only one of them will be described in detail. Reciprocally guided and slidably fitting through the valve seat member 40 there is a tubular metering valve 41 having a metering slot 42 cooperable with the bore of the seat member 40 to meter flow to the outlet passageway from the chamber 2. The valve member stem 43 extends upward through the central space within the annular float member 37 and is reciprocally guided at its upper end portion in an apertured guide member 44. The valve stem 43 is urged upward by a coil spring 45 which seats on the bottom wall 7 and has its upper end abutting a cross pin 46 which projects into a guide slot 47 in the supporting member 44. The upper end of the stem 43 has a rectangular platform or flange plate 48 secured rigidly thereto. The recess 39 is connected below the valve seat member 40 by a passageway 49 to an upflow passageway 50 formed as a recess in the bottom wall 7. The passage 50 terminates well above the outlet seat but below the liquid level L—L and connects through an air vent 51 with a downflow passage 52. The air vent 51 is formed by a continuous wall or tube 53 which extends upward above the highest possible liquid level in the chamber 2. The portion of the casing 1 between the passages 50 and 52 forms an overflow dam to maintain the valve seat for the outlet valve immersed in liquid. The effective liquid head on the outlet port or metering orifice is determined by the height of the liquid level above the height of the overflow dam. The passage 52 opens at its lower end into a horizontal passageway portion 54 which is internally screw threaded at its end portion which opens through the wall 6, see Fig. 5. The other outlet passageway 55 is controlled by a similar metering valve member 56 and contains a similar overflow dam 57 and downflow passage 58 connects into an outlet passageway portion 59 which is internally screw threaded at its end opening through the wall 5. The passageway portions 54 and 59 are separated by a wall or partition 60. The air vent tubes which surround the overflow dams are arranged in V relation and have in their angle a supporting boss 61 which terminates slightly below their top ends. The guide member 44 is generally triangular in plan view, see Fig. 7, so that it fits between the vent tubes. The boss 61 has a cylindrical recess 62 terminating downward in a concentric threaded bore 63. The guide member 44 has a downward extending cylindrical projection 64 which seats in the recess 62, see Fig. 8, a screw 65 passing downward through the member 44 and threadedly engaging in the bore 63 to tightly clamp the supporting member 44 in position.

Overlying the outlet passageway portions 54 and 59 there is a bridge member 66 which seats at its ends in rectangular sockets formed in the top inner faces of the walls 5 and 6. The bridge member 66 is tightly secured in position in these sockets by screws 67. The bridge member 66 has tubular downward extending guides 68, 69 spaced laterally and terminating at their upper ends in helical cams 70 which are of identical construction. Guided in the tubular members 68, 69 there are plungers 71, 72 respectively which extend upward above the top of the bridge member and terminate in hand adjustment knobs 73, 74 respectively, each having a downward extending cam follower 75. The followers 75 are each cooperable with a low limit stop 76 and a high limit stop 77 such that the knobs 73 and 74 are each capable of a substantially complete revolution. The plungers or thrust rods 72, 72 extend downward below the guide tubes 68, 69 and each has adjacent its bottom end a supporting disc or washer 78 on which a helical coil spring 79 rests. The springs 79 surround the tubes 68, 69 and bear upward against the underside of the bridge member 66 such that the springs are under compression urging the plungers downward and the follower members against their cams. The bridge member 66 has three equi-spaced bearing supports 80 which are joined by a vertical reinforcing web. A shaft 81 extends through and is supported by the bearing supports 80 and has journaled thereon a pair of plate-like levers 82, 83 which underlie and are engaged by the plungers 71, 72 respectively. The operating levers 82, 83 terminate in upward offset portions 84 which overlie the valve member platforms 48. Each of the portions 84 has a low or pilot fire adjustment screw 85 and a high fire or maximum adjustment screw 86 which are positioned longitudinally of their levers and on opposite sides of the valve members 43 and 56. Each of the screws 85, 86 has a stop disc 87 cooperable with studs 88 to limit rotation of the adjustment screws. By positioning the adjustment screws 85, 86 longitudinally of their supporting levers, the screws can be adjusted for sequential engagement with their respective valve member platforms. It will be apparent that with the follower 75 of knob 73 against its low fire stop 76 that the position of the metering slot 42 relative to its port can be adjusted by rotating the screw 85. Without changing or altering the position of the valve in its low fire setting as determined by the screw 85, the knob 73 can be rotated until the follower 75 engages the high fire stop 77 and then the position of the valve member relative to its port for high fire position can be adjusted by rotating the screw 86 which is now in engagement with the platform 48, the upward or clockwise rotation of the lever 83 having lifted the screw 85 out of engagement with the platform 48. The screws 85 and 86 are frictionally held in adjusted position by leaf springs 89 which are tensioned against the posts 88.

Adjacent the end casing wall 4 there is an auxiliary liquid chamber 90 which is internally cylindrical and open at its upper end into the chamber 2 but with its top edge above the highest liquid level in the chamber 2. The chamber 90 is provided with an overflow notch or dam 91 for inflow of liquid from the chamber 2, the dam being a predetermined height above the constant liquid level L—L, preferably about ¼". The chamber 90 is also in direct communication with the passageway portions 54 and 59 through their bottom walls via upwardly inclined passageways 92, 93 respectively which open into the chamber 90 at a point above the top surface of the portions 54 and 59. The height at which these passageways 92, 93 open into the chamber 90 is however below the height of the overflow dams between the up and down flow passages 50 and 52. Within the chamber 90 there is a piston type safety float 94 having an open bottom so that it is of bell form. The float 94 serves as a piston to discharge liquid from the chamber 90 through the passageways 92, 93 for resetting of the safety mechanism to be described. Secured rigidly as by solder or brazing to the top of the float 94 there is a thrust member 95 which is bifurcated at its upper end and terminates in laterally positioned flange portions forming an armature 96. Cooperable with the armature 96 there is a permanent magnet 97 which is carried by an arm 98 projecting from the bridge member 66. The magnet 97 is preferably positioned about $\frac{3}{16}$" from the armature 96 when the float 94 is seated on the bottom of the chamber 90. Pivoted between the arms of the thrust member 95 there is a safety lever 99 which projects at one end through a slot 100 in the wall 4 to provide a finger engaging end portion for resetting the safety mechanism and for depressing the float 94 to discharge liquid out through the passageway 92. The lever 99 has a hollow rectangular central portion which provides a space through which the metering valve mechanisms can extend. The lever 99 beyond its rectangular portion extends between the side members of the inlet valve supporting bracket 22 and is journaled therebetween on a shaft 101. Beyond the shaft 101 the lever has an end portion 102 which overlies the inlet valve stem 15. Adjustably screw threaded through the end portion 102 there is a screw 103 which upon upward movement of the float 94 is engageable with the end of the stem 15 to force the valve member 14 to tight closed position against its seat. The screw 103 is preferably adjusted so that with the float 94 seated on the bottom wall of its chamber, there will be a space of say .024" between the screw 103 and the valve stem 15.

Cooperable with the inlet valve member 14 there is a temperature responsive valve closing means 104 which is mounted on the casing 1 in overlying relation to the inlet valve operating mechanism. The means 104 has a housing formed by base and top members 105, 106, respectively, which are held together by screws 107. The base member 105 is secured to the casing 1 by screws 108 and has a downward extending guide tube 109 alined with the adjustment screw 31. Within the housing 104, there is a power element 110 comprising a rigid cap member having a downward-facing resilient metal diaphragm 111 sealed thereto to form an expansible-collapsible chamber having a feeler member tube 112 opening thereinto and hermetically sealed to the power element cap member. The tube 112 terminates in a tubular feeler member 113, see Fig. 5, which is charged under vacuum with a volatile liquid, such as aniline oil, so that the power element diaphragm is moved in response to temperature of the feeler member 113. The diaphragm 111 acts through a push rod or plunger 114 guided in the tube 109 and held in inactive raised position above the screw 31 by a surrounding coil spring 115 which determines the feeler member temperature at which the rod 114 will engage the screw 31 and move the valve member 14 to closed position. The power element 110 is supported in predetermined position by a nut or collar 116 adjustably screw threaded on a stem 117 through and in which the tube 112 is sealed and which is hermetically sealed through the power element cap member. The collar 116 seats on the housing top member 106 and is resiliently held thereagainst by a lost-motion spring 118 which permits upward movement of the power element 110 upon its continued expansion after seating of the valve member 14. The casing 1 is closed by a cover member 119 which is apertured for passage of the control members therethrough and which is secured in position by screws 120.

The operation of the control device is as follows: The inlet fitting 11 is connected to a source of fuel supply such as the usual elevated tank which may or may not have a shut off valve in its feed line. The passageway outlet portions 54, 59 are connected to a pair of vaporizing type fuel burners either by a straight horizontal pipe connected as illustrated in Fig. 10, or by the conventional flexible tubing, although the horizontal connection is preferable. In the position of the parts shown in Fig. 2, liquid fuel has filled the chamber 2 to the line L—L so that the inlet valve 14 is closed. If now it is desired to ignite the burner or burners one or both of the adjustment knobs 73, 74 is rotated toward open position which will cause the cam followers 75 to ride upward on the cams 70 thereby permitting the springs 45 to open their respective metering valves so that fuel will flow through the passageway portions 54, 59 to the burners. The fuel level maintained in the chamber 2 and therefore the liquid head on the outlet metering orifices may be adjusted by adjusting the magnet supporting screw 24. By moving the magnet 25 downward a lower fuel level will be maintained since the magnetic force will aid in buoying up the float so that the valve 14 will be closed at a lower liquid level. The magnetic force of the magnet 25 functions to maintain the level substantially constant irrespective of change in the head pressure against the valve member 14 or variation in overflow through the outlet passageways. This is because the magnetic attraction tending to lift the float decreases as the float drops lower such as is necessary for a wider opening for the valve member 14. Accordingly the decrease in magnetic force must be compensated by an increase in liquid level which increase is substantially that by which the level is lowered by the increased open position of the valve. If for any reason the valve member fails to seat tightly thereby permitting leakage into the chamber 2 when the outlet metering valve members are both closed, then the liquid level in the chamber will gradually increase and when it reaches the overflow dam will discharge into the chamber 90. Inflow of liquid into the chamber 90 will lift the safety float 94 and by reason of the close relation of the magnet 97 to its armature 96 only a very small quantity of liquid is necessary in the chamber 90 to cooperate with the magnetic force of the magnet 97 in order to quickly lift the lever 99 and drive the screw 103 sharply against the valve stem 15 thereby seating the valve member 14. If the burner or burners supplied by the control device should become extinguished or not be lighted after the outlet metering valves or either of them were opened so that the fuel level increases in one or both the burner pots above a safe level, then when the level increases in the unignited pot to the height of the opening of say the passageway 92 into the chamber 93, the inflow of liquid into the chamber 90 will raise the float 94 as above described thereby to operate the safety lever 99 and force the screw 103 against the valve stem 15. After sufficient liquid has flowed into the chamber 90 to actuate the safety mechanism, the mechanism can be reset by manually pushing the projecting lever end portion 99 downward and by reason of the piston action of the float 94 the excess liquid in the chamber 93 will be discharged therefrom and pass out through the passageway 92. During operation of the burner, the valve closing means 104 is operable to shut the inlet valve member 14 irrespective of the operation of the float 37. Should the temperature to which the feeler member 113 is subjected rise above the desired value, then the springs 115 will be overcome and the rod 114 will be forced downward against the screw 31, thus shutting the valve member 14 and soon stopping flow from the reservoir 2.

Referring to Fig. 10, the control device is shown with only a single outlet metering valve control, the other one of the outlet passageways from the constant level chamber being blocked off at its inlet from the chamber 2. In this form of the invention, the partition 60 between the outlet passageway portions 54, 59 has been opened so that the passageway portions are in communication with each other. In the screw threaded end portion of the outlet portion 59 there is a packing gland 130 through which a cleaning rod 131 is slidably and rotatably extended. The other outlet passageway portion 54 is directly connected by a horizontal pipe 132 to the inlet fitting 133 of a vaporizing burner 134. The cleaning rod 131 has sufficient lateral movement so that it can scrape the inside of the pipe 132 and is sufficiently long so that its inner end can be moved entirely through the pipe 132. In this form of the invention, the control device casing 1 is supported by the pipe 132 from the burner. The downflow passages from the overflow dams in the vent tubes 53 are each provided with a bushing designated 135, 136 respectively, to reduce the flow area. The downflow passage having the bushing 136 serves as a vent for air from the pipe 132 and passageway 54 and also serves as an air bleed to supply combustion air to the burner through the burner supply 132 from the interior of the casing 1. The operation of the control device is, except as above noted, identical to that of Figs. 1 to 9 inclusive above described.

Having thus described the invention, what is claimed and is desired to be secured by Letters Patent of the United States is:

1. A safety control valve, comprising a casing having a liquid chamber with an inlet and an outlet conduit, a valve member controlling said inlet, movable means cooperable with said valve member and responsive to liquid level in said chamber and acting at a predetermined normal liquid level to close said valve member, means forming an auxiliary chamber having communication above said predetermined level with said liquid chamber, conduit means communicatively connecting said outlet conduit with said auxiliary chamber and having a portion of its length positioned above the normal liquid level in said outlet conduit, and safety means operable on said valve member to close said valve member and including means actuated by inflow of liquid into said auxiliary chamber both from said outlet conduit through said conduit means and also directly from said liquid chamber.

2. A safety control valve for regulating the flow of liquid by gravity, comprising a casing having a liquid level chamber with an inlet and an outlet conduit, a valve member controlling said inlet, a float in said chamber, means operatively connecting said float to said valve member to close said valve member upon occurrence of a predetermined normal increasing liquid level in said chamber, means forming a normally empty auxiliary chamber communicating with said chamber at a predetermined level above said normal level, a float in said auxiliary chamber, means operable by said last-named float to close said valve member, and conduit means leading from said outlet conduit and discharging into said auxiliary chamber at a point above the operating level for said last named float.

3. A safety control valve for regulating the flow of liquid by gravity, comprising a casing having a liquid level chamber with an inlet and an outlet conduit leading from the mid-portion of said chamber, a valve member adjacent one end of said chamber and controlling said inlet, a float in said chamber, means operatively connecting said float to said valve member to close said valve member upon occurrence of a predetermined normal increasing liquid level in said chamber, means forming an auxiliary chamber adjacent the other end of said chamber and communicating with said chamber at a predetermined level above said normal level, conduit means leading from said outlet conduit and discharging into said auxiliary chamber, a float in said auxiliary chamber, a lever operable by said last-named float to close said valve member, said lever having a vertical opening therethrough registering with and overlying the inlet end of said outlet conduit, a valve member controlling said outlet conduit, and means extending through said lever opening and operable to actuate said last-named valve member, said conduit means having a portion of its length extended above the normal liquid level in said outlet conduit thereby normally to obstruct flow from said outlet conduit to said auxiliary chamber.

4. A safety control valve for regulating the flow of liquid by gravity, comprising a casing forming a constant level liquid chamber, said casing having an inlet opening upwardly into said chamber and containing a valve seat, a vertically reciprocal valve member cooperable with said seat and extending upward into said chamber, an annular float in said chamber, a bimetal supporting arm extending radially outward from said float and having an aperture therethrough loosely receiving said valve member, a lever member secured to the free end of said arm on the opposite side of said valve member from said float, said lever member having an aperture therethrough through which said valve member loosely extends, an inverted U-shaped supporting member carried by said casing and overlying said lever member, a shaft carried by said supporting member and pivotally supporting said lever member on the float side of said valve member, a resilient arm secured to said lever member and having an armature portion on the opposite side of said shaft from said valve member, said resilient arm having an aperture therethrough through which said valve member extends, a magnet adjustably supported from the cross member of said supporting member and in cooperable relation to said armature, means supporting said valve member from said resilient arm, an adjustment screw cooperable with said lever member and said resilient arm to position said valve member relative to said float, said casing having an outlet passageway with an outlet port facing upward into said chamber within the area of said float, a metering valve cooperable with said outlet port and extending upward through the central space within said float, said metering valve having a platform, a valve operating lever fulcrumed in said casing and having an end portion overlying said platform, adjustable screws projecting from said lever and sequentially engageable with said platform to control the movement of said valve, means to operate said lever, a spring urging said valve toward said screws, said casing containing an auxiliary chamber at its end opposite said inlet, said auxiliary chamber having an overflow dam from said constant level chamber, a safety float in said auxiliary chamber and having an upstanding stem terminating in an armature, a magnet carried by said casing and cooperable with said stem armature, a safety lever pivotally secured to said stem and extending through said U-shaped member into overlying engageable relation to said inlet valve member, means pivotally securing said safety lever to said U-shaped member, said safety lever having an opening therethrough for passage of said valve lever operating means, said outlet passageway having a horizontal portion, said casing having a conduit connecting said horizontal portion to said auxiliary chamber at a point above the liquid floating level for said safety float, and means providing an overflow dam in said outlet passageway between said outlet port and said horizontal portion.

5. A control valve for regulating the flow of liquid by gravity, comprising a casing having a liquid level chamber with an inlet and an outlet, a valve member controlling said inlet and extending upward into said chamber, a float in said chamber, and a lever having a plurality of vertically spaced leaves, the middle one of said leaves having a fulcrum, the upper one of said leaves being resilient, means connecting said valve member to said upper one, means to adjust said upper one relative to said middle one of said leaves, the lower one of said leaves being bimetallic and being secured to and supporting said float.

6. A control valve for regulating the flow of liquid by gravity, comprising a casing having a liquid level chamber with an inlet and an outlet, a valve member controlling said inlet and extending upward into said chamber, a float in said chamber, a lever having a plurality of vertically spaced leaves, the middle one of said leaves having a fulcrum, the upper one of said leaves being resilient, means connecting said valve member to said upper one, means to adjust said upper one relative to said middle one of said leaves, the lower one of said leaves being bimetallic and being secured to and supporting said float, said leaves having alined apertures therethrough through which said valve member extends, a safety lever overlying said lever and having an end portion engageable with said valve stem, and means including a magnet for moving said safety lever into engagement with said valve member.

7. A control valve for regulating the flow of liquid by gravity, comprising a casing having a constant level chamber with an inlet and an outlet, said inlet having a valve seat, a valve member cooperable with said seat and extending into said chamber, a float in said chamber, a lever pivotally supported in said casing, a supporting arm for said float secured to said lever on the opposite side of its fulcrum from the float, said lever and said arm connecting said float to said valve member, and counterbalancing magnetic means cooperable with said lever at the other end thereof on the other side of the fulcrum from the connection wtih said supporting arm, said magnetic means being positioned to maintain a predetermined clearance relative to said lever and to said float and said valve member so that variation in liquid head on said inlet is compensated and substantially the same liquid level is maintained in said chamber irrespective of change in said liquid head.

8. A safety control valve for regulating the flow of liquid by gravity, comprising a casing forming a constant level liquid chamber and having an inlet and an outlet passageway, a float controlled valve controlling the inflow of liquid into said chamber through said inlet, said outlet passageway having an upward facing outlet port opening into said chamber and having an elevated overflow portion on the outlet side of and positioned above the level of said port, said outlet passageway having a horizontal portion on the outlet side of said overflow portion and opening laterally through the wall of said casing, means forming an auxiliary chamber in said casing, the wall of said auxiliary chamber having upper and lower inlet openings, the upper opening communicating directly with said constant level chamber above the normal liquid level therein, a safety float in said auxiliary chamber, said lower opening communicating through conduit means directly with said horizontal passageway portion and opening into said auxiliary chamber above the operating liquid level for said safety float, and means operable by said safety float for moving said valve to closed position.

9. A safety control valve for regulating the flow of liquid by gravity, comprising a casing forming a constant level liquid chamber and having an inlet and an outlet passageway, a float controlled valve controlling the inflow of liquid into said chamber through said inlet, said outlet passageway having an upward facing outlet port opening into said chamber and having an elevated overflow portion on the outlet side of and positioned above the level of said port, said outlet passageway having a horizontal portion on the outlet side of said overflow portion and opening laterally through the wall of said casing, means forming an auxiliary chamber in said casing, the wall of said auxiliary chamber having upper and lower inlet openings, the upper opening communicating directly with said constant level chamber above the normal liquid level therein, a safety float in said auxiliary chamber, said lower opening communicating through conduit means directly with said horizontal passageway portion and opening into said auxiliary chamber above the operating liquid level for said safety float, means operable by said safety float for moving said valve to closed position, said casing having a wall aperture above the liquid level, and manual operating means extending through said aperture for depressing said safety float to discharge liquid from said auxiliary chamber out through said lower inlet opening, said safety float substantially fitting said auxiliary chamber thereby to form a liquid discharge plunger.

10. A control valve for regulating the flow of liquid by gravity, comprising a casing forming a liquid chamber having an inlet and an outlet passageway, means operable to maintain a substantially constant liquid level in said chamber, said outlet passageway having a valve port and a horizontal portion and having therebetween an air-vented vertically extending overflow portion discharging downward into said horizontal portion, said vertically extending portion having its overflow level at a height sufficiently above the top of said port to maintain a column of liquid therein which is higher than the top of said valve port thereby to maintain said port immersed in liquid, and a valve cooperable with said port.

11. In a control valve for regulating the flow of liquid by gravity, a casing forming a liquid chamber having an upward facing inlet port, a valve member reciprocal to and from said port and having a horizontal slot in its stem portion, a float operated lever having a rod extending through said slot, a spring holding one side of said slot against said rod, said lever having an opening therethrough overlying said rod and of a size operable to receive said stem and to hold the same with said slot and said rod in engagement, and said lever opening having a portion extending laterally to said rod and permitting lateral disengagement of said stem from said rod.

12. In a safety control valve, a casing forming a main liquid level chamber having an inlet and an outlet, a float operated valve controlling said inlet to maintain a substantially constant liquid level in said chamber, a lever journaled adjacent and having one end overlying said valve and engageable with said valve to close the same, a safety float, a thrust member extending upward from said float and terminating at its upper end in parallel arms receiving said lever therebetween, means pivotally connecting said arms to said lever, said casing having an auxiliary chamber containing said safety float, a wall of said auxiliary chamber having an overflow portion above the constant liquid level in said main chamber for discharge of liquid from said main chamber into said auxiliary chamber, said arms terminating at their upper ends in lateral flanges forming an armature, and a magnet acting on said armature and tending to lift said float, said magnet being operable upon upward movement of said float to lift said float and said lever thereby to engage forcefully said one lever end with said valve to seat said valve.

13. A control valve for regulating the flow of liquid by gravity, comprising a casing having a liquid level chamber with an inlet and an outlet, a valve member in said chamber and controlling said inlet, a float member in said chamber, adjustable lever means having two arms, one connected to said float member and the other to said valve member, a temperature responsive power element mounted on said casing in overlying relation to said valve member, a plunger extending downward into said casing from and movable by said power element, an adjustment screw cooperable with said lever arms to change the position of said float member relative to said valve member, and said screw being positioned on said arms on the opposite side of the fulcrum of said lever means from said float member and alined with and engageable by said plunger to move said valve member to close said inlet.

14. A safety control valve for regulating the flow of liquid by gravity, comprising a casing forming a constant lever liquid chamber, said casing having an inlet opening upwardly into said chamber and containing a valve seat, a vertically reciprocal valve member cooperable with said seat and extending upward into said chamber, an annular float in said chamber, a bimetal supporting arm extending radially outward from said float and having an aperture therethrough loosely receiving said valve member, a lever member secured to the free end of said arm on the opposite side of said valve member from said float, said lever member having an aperture therethrough through which said valve member loosely extends, a shaft carried by said casing and pivotally supporting said lever member on the float side of said valve member, a resilient arm secured to said lever member and having an armature portion on the opposite side of said shaft from said valve member, said resilient arm having an aperture therethrough through which said valve member extends, a magnet adjustably supported above and in cooperable relation to said armature, means supporting said valve member from said resilient arm, an adjustment screw cooperable with said lever member and said resilient arm to position said valve member relative to said float, said casing having an outlet passageway with an outlet port facing upward into said chamber within the area of said float, a metering valve cooperable with said outlet port and extending upward through the central space within said float, said metering valve having a platform, a valve operating lever fulcrumed in said casing and having an end portion overlying said platform, operating means to move said lever through a predetermined range of movement, a pair of adjustable screws engageable with said platform to determine the range of movement of said metering valve by said predetermined lever movement, one of said screws being carried by said lever and engaging said platform for transmitting lever movement to said metering valve, said one screw determining the extent of opening of said metering valve at one end of its range of movement, the other of said screws engaging said platform to determine the extent of opening of said metering valve at the other end of its range of movement, a spring urging said valve toward said screws, said casing containing an auxiliary chamber at its end opposite said inlet, said auxiliary chamber having an overflow dam from said constant level chamber, a safety float in said auxiliary chamber and having an upstanding stem terminating in an armature, a magnet carried by said casing and cooperable with said stem armature, a safety lever pivotally secured to said stem and extending into overlying engageable relation to said inlet valve member, means pivotally securing said safety lever to said casing, and said safety lever having an opening therethrough for passage of said valve lever operating means.

15. In a control valve, a casing having a valve port, a valve member controlling said port and having a stem portion with a transverse slot therein, a lever having an opening therethrough receiving said stem portion, means on said lever extending toward the base of and into said slot and engageable with the slot wall to transmit movement from said lever to said valve member, said lever opening having first and second wall portions spaced from said means and positioned longitudinally of said slot, the spacing of said first wall portion from said means being such that said stem portion can pass therebetween, and said second wall portion being cooperable with said stem portion to maintain said means and the wall of said slot in operative relation when said stem portion is between said means and said second wall portion.

MARION E. LANDON,
*Administratrix of the Estate of Walter S. Landon, Deceased.*

REFERENCES CITED

The following references are of record in the file of this patent:

UNITED STATES PATENTS

| Number | Name | Date |
|---|---|---|
| 723,698 | Marsh | Mar. 24, 1903 |
| 1,817,069 | Dickey | Aug. 4, 1931 |
| 2,019,461 | Russel | Oct. 29, 1935 |
| 2,068,138 | Johnson | Jan. 19, 1937 |
| 2,226,313 | Little | Dec. 24, 1940 |
| 2,234,088 | Russel | Mar. 4, 1941 |
| 2,299,707 | Svirsky | Oct. 20, 1942 |
| 2,317,556 | Russel | Apr. 27, 1943 |
| 2,346,813 | Breese | Apr. 18, 1944 |
| 2,387,858 | Russel | Oct. 30, 1945 |
| 2,397,120 | Breese | Mar. 26, 1946 |

FOREIGN PATENTS

| Number | Country | Date |
|---|---|---|
| 589,617 | Germany | of 1933 |